US011610732B2

United States Patent
Choi et al.

(10) Patent No.: US 11,610,732 B2
(45) Date of Patent: Mar. 21, 2023

(54) MULTILAYER CAPACITOR AND METHOD OF MANUFACTURING THE SAME

(71) Applicant: SAMSUNG ELECTRO-MECHANICS CO., LTD., Suwon-si (KR)

(72) Inventors: Tai Won Choi, Suwon-si (KR); Ki Pyo Hong, Suwon-si (KR); Ji Hun Lee, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 0 days.

(21) Appl. No.: 17/545,294

(22) Filed: Dec. 8, 2021

(65) Prior Publication Data
US 2022/0238274 A1 Jul. 28, 2022

(30) Foreign Application Priority Data
Jan. 22, 2021 (KR) .................. 10-2021-0009479

(51) Int. Cl.
H01G 4/005 (2006.01)
H01G 4/30 (2006.01)
H01G 4/232 (2006.01)
H01G 4/248 (2006.01)

(52) U.S. Cl.
CPC ............ *H01G 4/005* (2013.01); *H01G 4/232* (2013.01); *H01G 4/248* (2013.01); *H01G 4/306* (2013.01)

(58) Field of Classification Search
None
See application file for complete search history.

(56) References Cited

U.S. PATENT DOCUMENTS

| 8,717,738 B2 * | 5/2014 | Nishioka | H01G 4/30 |
| | | | 361/301.4 |
| 2006/0039097 A1 * | 2/2006 | Satou | H01G 4/30 |
| | | | 361/303 |
| 2006/0139848 A1 * | 6/2006 | Kim | H01G 4/012 |
| | | | 361/306.3 |
| 2012/0073129 A1 * | 3/2012 | Abe | H01G 4/30 |
| | | | 29/825 |

(Continued)

FOREIGN PATENT DOCUMENTS

| CN | 102568824 A | * 7/2012 | ............ H01G 4/005 |
| JP | 2012-94819 A | 5/2012 | |

(Continued)

*Primary Examiner* — Dion R. Ferguson
(74) *Attorney, Agent, or Firm* — Morgan, Lewis & Bockius LLP

(57) ABSTRACT

A multilayer capacitor includes a capacitor body including first to sixth surface, and including a plurality of dielectric layers, and first and second internal electrodes; and first and second external electrodes. The first and second internal electrodes include first and second capacitance forming portion, first and second lead-out portion extending from the first and second capacitance forming portion toward the third surface of the capacitor body and connected to the first and second external electrode, and first and second dot pattern portion formed in at least one corner of the first and second capacitance forming portion. The first dot pattern portion and the second dot pattern portion have dot patterns not overlapping each other in the first direction.

11 Claims, 5 Drawing Sheets

(56) References Cited

U.S. PATENT DOCUMENTS

| 2012/0075766 | A1* | 3/2012 | Nishioka | H01G 4/005 |
| | | | | 361/301.4 |
| 2014/0174806 | A1* | 6/2014 | Park | H01G 2/06 |
| | | | | 361/321.2 |
| 2018/0075968 | A1* | 3/2018 | Nakanishi | H01G 4/232 |
| 2022/0238274 | A1* | 7/2022 | Choi | H01G 4/232 |

FOREIGN PATENT DOCUMENTS

| JP | 2018133419 A | * | 8/2018 |
| KR | 10-058706 B1 | | 6/2006 |

\* cited by examiner

MULTILAYER CAPACITOR AND METHOD OF MANUFACTURING THE SAME

CROSS-REFERENCE TO RELATED APPLICATION(S)

This application claims benefit of priority to Korean Patent Application No. 10-2021-0009479 filed on Jan. 22, 2021 in the Korean Intellectual Property Office, the disclosure of which is incorporated herein by reference in its entirety.

TECHNICAL FIELD

The present disclosure relates to a multilayer capacitor and a method of manufacturing the same.

BACKGROUND

A multilayer capacitor (a multilayer ceramic capacitor; MLCC) maybe one of passive component components and may control an electrical signal in a circuit.

Recently, as the performance of electronic devices such as electronic products and computers has improved, high reliability has also been required for a multilayer capacitor applied thereto.

To increase moisture resistance reliability of a multilayer capacitor, it may be necessary to reduce a moisture penetration path, and as one of such methods, a bottleneck structure may be applied to an internal electrode.

However, a stepped portion may be formed in the corners of the bottleneck patterns of the internal electrode opposing each other, which may cause an increase in a short-circuit rate or degradation of reliability.

SUMMARY

An aspect of the present disclosure is to provide a multilayer capacitor in which a bottleneck structure is applied to an internal electrode to reduce a moisture penetration path and also to prevent a stepped portion in the corners of the bottleneck pattern, thereby preventing an increase in a short-circuit rate and improving reliability, and a method of manufacturing the same.

According to an aspect of the present disclosure, a multilayer capacitor includes a capacitor body including first and second surfaces opposing each other in a first direction of the capacitor body, third and fourth surfaces opposing each other in a second direction of the capacitor body, and fifth and sixth surface disposed in a third direction of the capacitor body, and including a plurality of dielectric layers, and first and second internal electrodes alternately disposed in the first direction with the dielectric layer interposed therebetween; and first and second external electrodes disposed on both ends of the capacitor body in the second direction, respectively. The first internal electrode includes a first capacitance forming portion, a first lead-out portion extending from the first capacitance forming portion toward the third surface of the capacitor body and connected to the first external electrode, and a first dot pattern portion disposed in at least one corner of the first capacitance forming portion. The second internal electrode includes a second capacitance forming portion overlapping the first capacitance forming portion in the first direction, a second lead-out portion extending from the second capacitance forming portion toward the fourth surface of the capacitor body and connected to the second external electrode, and a second dot pattern portion disposed in at least one corner of the second capacitance forming portion.

The first dot pattern portion and the second dot pattern portion have dot patterns not overlapping each other in the first direction.

Lengths of the first and second lead-out portions in the third direction may be less than lengths in the third direction of the first and second capacitance forming portions, respectively.

In the first dot pattern portion, a dot-shaped first electrode portion and a first space portion may be alternately disposed in the second and third directions, and in the second dot pattern portion, a dot-shaped second electrode portion and a second space portion may be alternately disposed in the second and third directions.

The first electrode portion may overlap the second space portion in the first direction, and the second electrode portion may overlap the first space portion in the first direction.

An average thickness of the first electrode portion may be 70 to 90% of an average thickness of the first capacitance forming portion, and an average thickness of the second electrode portion may be 70 to 90% of an average thickness of the second capacitance forming portion.

The capacitor body may include an active region in which the first and second capacitance forming portions overlap each other in the first direction, and upper and lower cover regions disposed on upper and lower surfaces of the active region, respectively.

The first and second external electrodes may include first and second connection portions disposed on the third and fourth surfaces of the capacitor body, respectively; and first and second band portions extending from the first and second connection portions to a portion of the first surface of the capacitor body, respectively.

According to an aspect of the present disclosure, a mounting board on which a multilayer capacitor is mounted includes a board having a plurality of electrode pads on one surface thereof; and the multilayer capacitor in which an external electrode is connected to the electrode pad.

According to an aspect of the present disclosure, a method of manufacturing a multilayer capacitor includes forming first and second internal electrodes on first and second ceramic sheets, respectively; forming a laminate by laminating a plurality of first and second ceramic sheets on which the first and second internal electrodes are formed such that the first and second internal electrodes oppose each other with the first and second ceramic sheets interposed therebetween and pressing the first and second ceramic sheets; forming a capacitor body including first and second surfaces opposing each other in a first direction of the capacitor body, third and fourth surfaces opposing each other in a second direction of the capacitor body, and fifth and sixth surface disposed in a third direction of the capacitor body, and including first and second lead-out portions of the first and second internal electrodes exposed through the third and fourth surfaces, respectively, by cutting the laminate at each region corresponding to a single capacitor and performing baking; and forming first and second external electrodes on the capacitor body to be electrically connected to the first and second lead-out portions, respectively. The first internal electrode includes a first capacitance forming portion, a first lead-out portion extending from the first capacitance forming portion toward the third surface of the capacitor body and connected to the first external electrode, and a first dot pattern portion formed in at least one corner of the first capacitance forming portion, and the second internal electrode includes a second capacitance forming portion overlapping the first capacitance forming portion in the first direction, a second lead-out portion extending from the second capacitance forming portion toward the fourth surface of the capacitor body and connected to the second external electrode, and a second dot pattern portion formed in at least one corner of the second capacitance forming portion.

The second dot pattern portion may be formed to not overlap the first dot pattern portion in the first direction.

The first internal electrode may be formed by disposing a printing screen including a wire mesh on the first ceramic sheet, applying a conductive paste to the wire mesh by a predetermined thickness, and printing a first internal electrode pattern such that one end in a length direction is formed as the first lead-out portion having a bottleneck shape on the wire mesh to which the conductive paste is applied and the first dot pattern is formed in the at least one corner, and developing an exposed conductive paste. The second internal electrode may be formed by disposing a printing screen including a wire mesh on the second ceramic sheet, applying a conductive paste to the wire mesh by a predetermined thickness, and printing a second internal electrode pattern such that the other end in the length direction is formed as the second lead-out portion having a bottleneck shape on the wire mesh to which the conductive paste is applied and the second dot pattern is formed in the at least one corner, and developing an exposed conductive paste.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Figure 1:
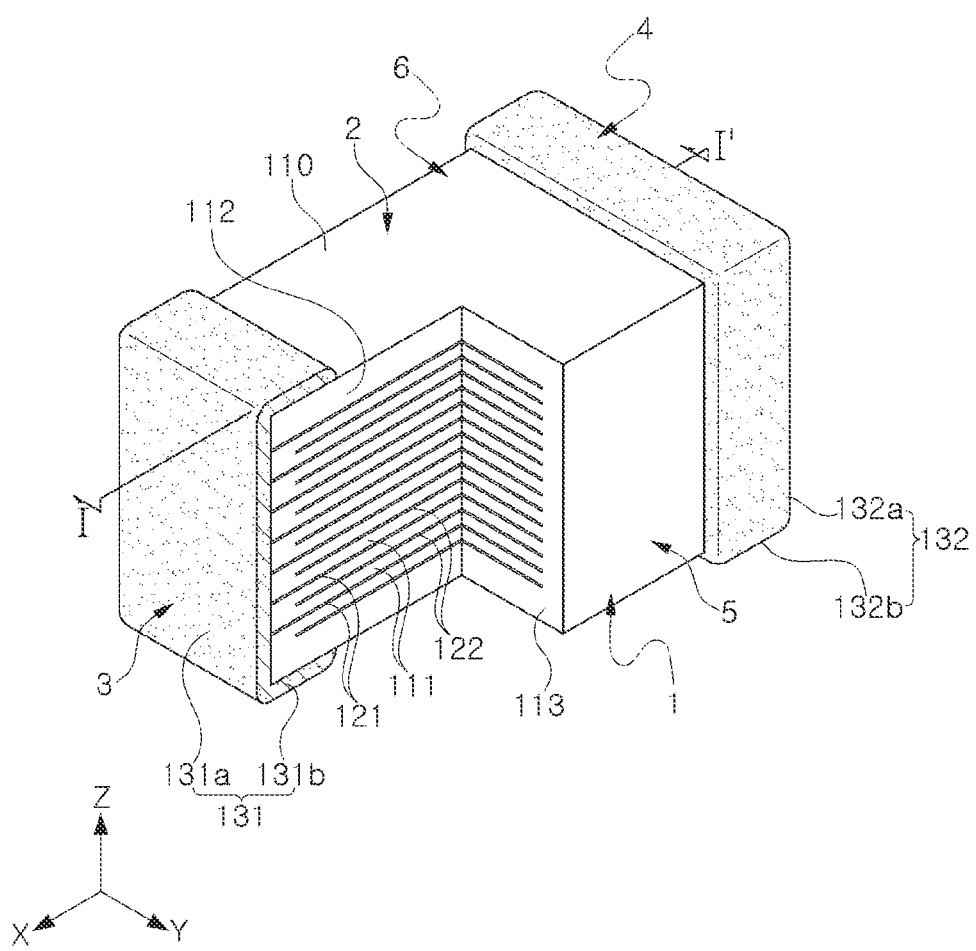
FIG. 1 is a perspective diagram illustrating a multilayer capacitor of which a portion is cut out according to an example embodiment of the present disclosure.

Hereinafter, embodiments of the present disclosure will be described as follows with reference to the attached drawings.

The present disclosure may, however, be exemplified in many different forms and should not be construed as being limited to the specific embodiments set forth herein.

Rather, these embodiments are provided such that this disclosure will be thorough and complete, and will fully convey the scope of the disclosure to those skilled in the art.

Shapes and sizes of elements in the drawings may be exaggerated for clarity of description, and elements indicated by the same reference numeral are same elements in the drawings.

Also, it will be understood that when a portion "includes" an element, it may further include another element, not excluding another element, unless otherwise indicated.

In the example embodiments, as for the direction of the capacitor body, X, Y, and Z indicated in the drawings may indicate a length direction, a width direction, and a thickness direction of the capacitor body, respectively.

The thickness direction may be used as a first direction, the length direction may be used as a second direction, and the width direction may be used as a third direction.

The Z direction may be the same as a lamination direction in which the dielectric layers are laminated.

Figure 2A:
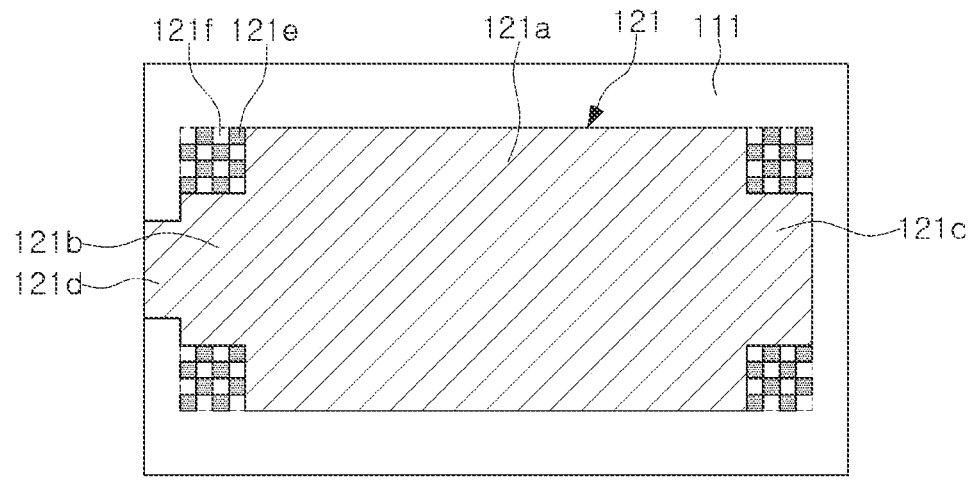
FIGS. 2A and 2B are plan diagrams illustrating first and second internal electrodes, respectively, according to an example embodiment of the present disclosure.
Figure 2B:
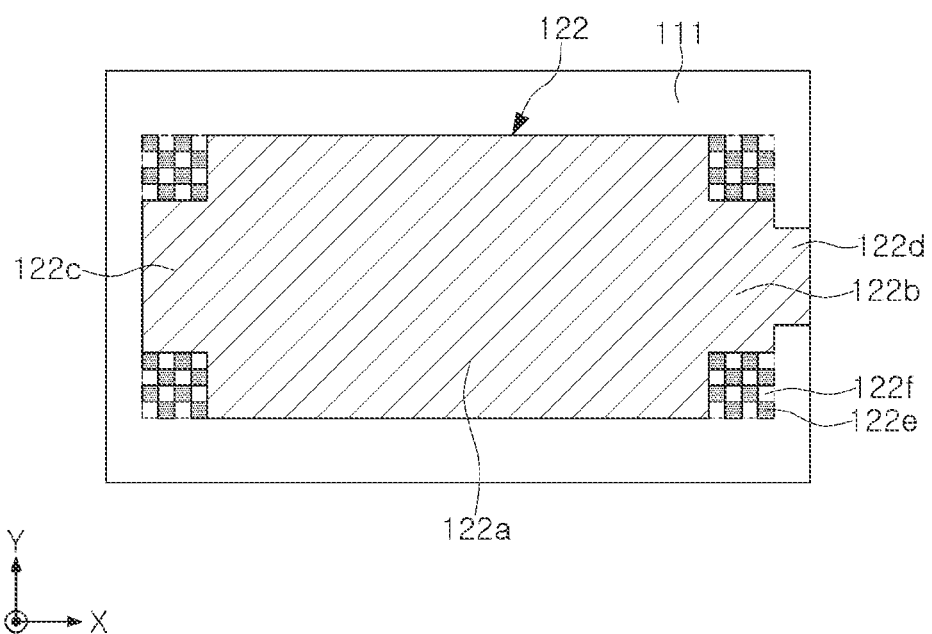
Figure 3:
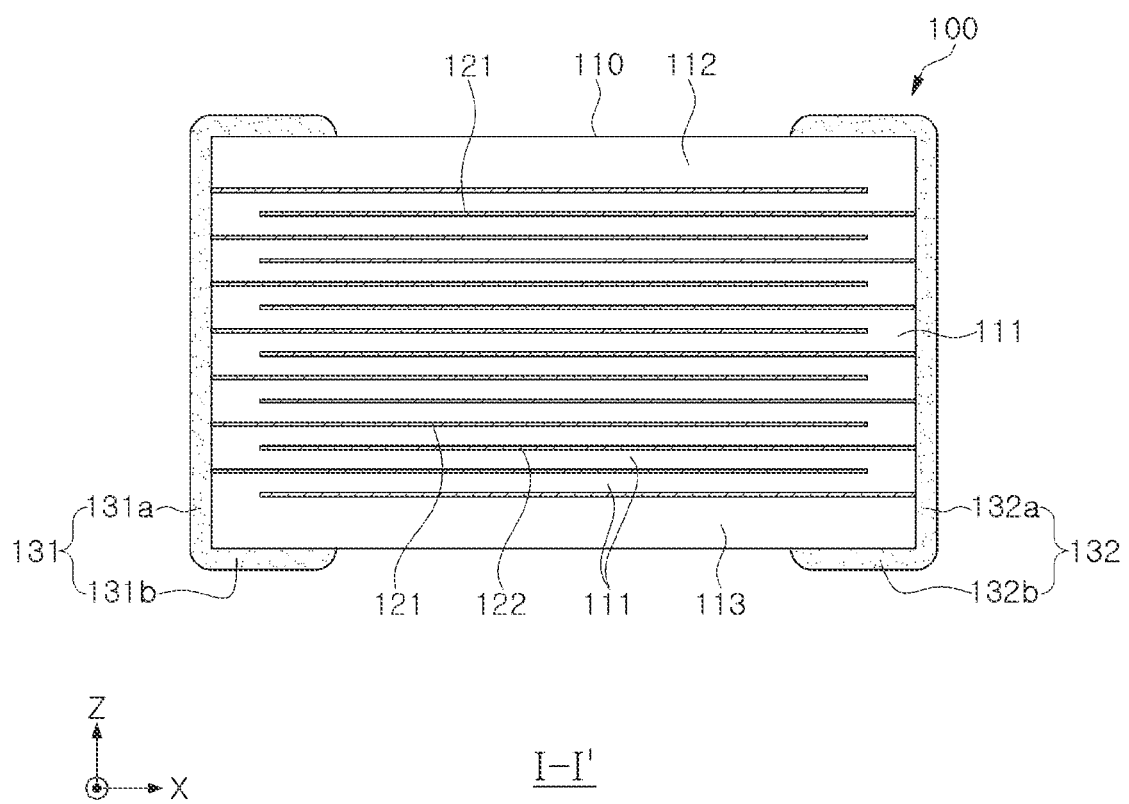
FIG. 3 is a cross-sectional diagram taken along line I-I' in FIG. 1.

FIG. 1 is a perspective diagram illustrating a multilayer capacitor of which a portion is cut out according to an example embodiment. FIGS. 2A and 2B are plan diagrams illustrating first and second internal electrodes, respectively, according to an example embodiment. FIG. 3 is a cross-sectional diagram taken along line I-I' in FIG. 1.

Referring to FIGS. 1 to 3, a multilayer capacitor 100 in the example embodiment may include a capacitor body 110 and first and second external electrodes 131 and 132.

The capacitor body 110 may include a plurality of dielectric layers 111 and a plurality of first internal electrodes 121 and second internal electrodes 122 alternately disposed in the Z direction with the dielectric layers 111 interposed therebetween.

The capacitor body 110 may be formed by laminating the plurality of dielectric layers 111 in the Z direction and baking the plurality of dielectric layers 111, and boundaries between the dielectric layers 111 of the capacitor body 110 adjacent to each other may be integrated such that it may be difficult to identify boundaries therebetween without using a scanning electron microscope (SEM).

The capacitor body 110 may have a substantially hexahedral shape, but an example embodiment thereof is not limited thereto. Also, the shape and size of the capacitor body 110 and the number of laminated dielectric layers 111 are not limited to the illustrated examples in the drawings.

In the example embodiment, both surfaces of the capacitor body 110 opposing each other in the Z direction may be defined as first and second surfaces 1 and 2, both surfaces connected to the first and second surfaces 1 and 2 and opposing in the X direction may be defined as third and fourth surfaces 3 and 4, and both surfaces connected to the first and second surfaces 1 and 2 and the third and fourth surfaces 3 and 4 and opposing each other in the Y direction may be defined as fifth and sixth surfaces 5 and 6.

Also, in the example embodiment, the surface on which the multilayer capacitor 100 is mounted may be the first surface 1 of the capacitor body 110.

The dielectric layers 111 may include a high-k ceramic material, a barium titanate ($BaTiO_3$) or a strontium titanate ($SrTiO_3$) ceramic powder, for example, but an example embodiment thereof is not limited thereto as long as sufficient capacitance is able to be obtained.

The dielectric layers 111 may further include ceramic additives, organic solvents, plasticizers, binders, and dispersants in addition to ceramic powder.

As the ceramic additives, a transition metal oxide or a transition metal carbide, a rare earth element, magnesium (Mg) or aluminum (Al) may be used.

The capacitor body 110 may include an active region contributing to the formation of capacitance of the capacitor, and upper and lower covers 112 and 113 formed on upper and lower surfaces of the active region in the Z direction as upper and lower margin portions, respectively.

The upper and lower covers 112 and 113 may have a material and a configuration the same as those of the first and second dielectric layers 111 and 112 other than the configuration in which the upper and lower covers do not include internal electrodes.

The upper and lower covers 112 and 113 may be formed by laminating a single dielectric layer or two or more dielectric layers on upper and lower surfaces of the active region in the Z direction, respectively, and may prevent damages to the first and second internal electrodes 121 and 122 caused by physical or chemical stress.

The first and second internal electrodes 121 and 122 may be applied with different polarities, and may be alternately disposed in the Z direction with the dielectric layer 111 interposed therebetween, and one ends thereof may be exposed to (or be in contact with or extend from) the third and fourth surfaces 3 and 4 of the capacitor body 110, respectively.

In this case, the first and second internal electrodes 121 and 122 may be electrically insulated from each other by the dielectric layer 111 disposed therebetween.

Accordingly, the ends of the first and second internal electrodes 121 and 122, alternately exposed through the third and fourth surfaces 3 and 4 of the capacitor body 110, may be electrically connected to the first and second external electrodes 130 and 140 disposed on the third and fourth surfaces 3 and 4 of the capacitor body 110, respectively.

The first internal electrode 121 may include a first capacitance forming portion 121a, a first lead-out portion 121d, and a first dot pattern portion. Reference numerals 121b and 121c denote portions formed to protrude from the first capacitance forming portion 121a by the dot pattern portion.

The first capacitance forming portion 121a may be spaced apart from the third to sixth surfaces 3-6 of the capacitor body 110 and may contribute to forming capacitance of the capacitor.

The first lead-out portion 121d may extend from the first capacitance forming portion 121a to be exposed toward the third surface 3 of the capacitor body 110 and may be connected to the first external electrode 131.

In this case, the length of the first lead-out portion 121d in the Y direction may be smaller than the length 121a in the Y direction of the first capacitance forming portion. For example, the first internal electrode 121 may have a bottleneck pattern in which the first lead-out portion 121d has a bottleneck shape.

The first dot pattern portion may be formed in at least one corner of the first capacitance forming portion 121a.

The first dot pattern portion may include a first electrode portion 121e having a dot shape and a first space portion 121f having a dot shape and working as a margin portion, the first electrode portion 121e and the first space portion 121f may be alternately disposed in the X direction and the Y direction, and may be disposed in a checkerboard pattern, for example.

In this case, an average thickness of the first electrode portion 121e in the Z direction may be 70 to 90% of an average thickness of the first capacitance forming portion 121a.

When the average thickness of the first electrode portion 121e is less than 70% of the average thickness of the first capacitance forming portion 121a, electrode connectivity may decrease, which may cause a decrease in capacitance of the capacitor. When the average thickness of the first electrode portion 121e exceeds 90% of the average thickness of the first capacitance forming portion 121a, the effect of improving the step difference by the dot pattern portion may not be properly implemented.

In the example embodiment, the first dot pattern portion may be formed in overall four corners of the first capacitance forming portion 121a, but the first dot pattern portion may be formed in three or less corners of the first capacitance forming portion 121a, or alternatively, to reduce the step difference, the first dot pattern portion may be formed in four corners of the first capacitance forming portion 121a.

The second internal electrode 122 may include a second capacitance forming portion 122a, a second lead-out portion 122d, and a second dot pattern portion. Reference numerals 122b and 122c denote portions formed to protrude from the second capacitance forming portion 122a by the dot pattern portion.

The second capacitance forming portion 122a may be spaced apart from the third to sixth surfaces 3-6 of the capacitor body 110 and may overlap the first capacitance forming portion 121a in the Z direction. The second capacitance forming portion 122a may contribute to forming capacitance of the capacitor.

The second lead-out portion 122d may extend from the second capacitance forming portion 122a to be exposed toward the fourth surface 4 of the capacitor body 110 and may be connected to the second external electrode 132.

In this case, the length of the second lead-out portion 122d in the Y direction may be smaller than the length in the Y direction of the second capacitance forming portion 122a. For example, in the second internal electrode 122, the second lead-out portion 122d may have a bottleneck pattern similar to the bottleneck shape.

The second dot pattern portion may be formed in at least one corner of the second capacitance forming portion 122a.

The second dot pattern portion may include a second electrode portion 122e having a dot shape and a second space portion 122f having a dot shape and working as a margin portion, and the second electrode portion 122e and the second space portion 122f maybe alternately disposed in the X direction and the Y direction, and may be disposed in a checkerboard shape, for example.

In this case, the average thickness of the second electrode portion 122e in the Z direction may be 70 to 90% of the average thickness of the second capacitance forming portion 122a.

When the average thickness of the second electrode portion 122e is less than 70% of the average thickness of the second capacitance forming portion 122a, electrode connectivity may decrease, which may cause a decrease in capacitance of the capacitor. When the average thickness of the second electrode portion 122e exceeds 90% of the average thickness of the second capacitance forming portion 122a, the effect of improving the step difference by the dot pattern portion may not be properly implemented.

In the example embodiment, the second dot pattern portion maybe formed in four corners of the second capacitance forming portion 122a, but the second dot pattern portion may be formed in three or less corners of the second capacitance forming portion 122a, or alternatively, to reduce the step difference, the second dot pattern portion may be formed in four corners of the second capacitance forming portion 122a.

Also, the first dot pattern portion and the second dot pattern portion may have dot patterns not overlapping each other in the Z direction, respectively.

More specifically, the first electrode portion 121e of the first dot pattern portion may overlap the second space portion 122f of the second dot pattern portion in the Z direction, and the first space portion 121*f* of the first dot pattern portion may overlap the second electrode portion 122*e* of the second dot pattern portion in the Z direction.

By the above-described configuration, when a predetermined voltage is applied to the first and second external electrodes 131 and 132, electric charges may be accumulated between the first and second internal electrodes 121 and 122.

In this case, capacitance of the multilayer capacitor 100 may be proportional to an area of overlap between the first capacitance forming portion 121*a* of the first internal electrode 121 and the second capacitance forming portion 122*a* of the second internal electrode 122, overlapping each other in the Z direction in the active region of the capacitor body 101.

Also, a material for forming the first and second internal electrodes 121 and 122 is not limited to any particular material, and, for example, a conductive paste including noble material such as platinum (Pt), palladium (Pd), palladium-silver (Pd—Ag) alloy, or the like, and at least one of nickel (Ni) and copper (Cu) may be used.

In this case, the method for printing the conductive paste may use a screen printing method or a gravure printing method, but an example embodiment thereof is not limited thereto.

The first and second external electrodes 131 and 132 may be provided with voltages of different polarities, may disposed on both ends of the capacitor body 110 in the X direction, and may be electrically connected to exposed portions of the first and second internal electrodes 121 and 122, respectively.

In this case, the first and second external electrodes 131 and 132 may include a conductive layer formed on the capacitor body 110 and a plating layer formed on the conductive layer.

The plating layer may include a nickel (Ni) plating layer formed on the conductive layer and a tin (Sn) plating layer formed on the nickel (Ni) plating layer.

The first external electrode 131 may include a first connection portion 131*a* and a first band portion 131*b*.

The first connection portion 131*a* may be formed on the third surface 3 of the capacitor body 110 and may be connected to an exposed portion of the first internal electrode 121, and the first band portion 131*b* may extend from the first connection portion 131*a* to a portion of the first surface 1 of the capacitor body 110.

In this case, the first band portion 131*b* may further extend to a portion of the fifth and sixth surfaces 5 and 6 of the capacitor body 110 and a portion of the second surface 2 so as to improve adhesion strength.

The second external electrode 132 may include a second connection portion 132*a* and a second band portion 132*b*.

The second connection portion 132*a* maybe formed on the fourth surface 4 of the capacitor body 110 and may be connected to an exposed portion of the second internal electrode 122, and the second band portion 132*b* may extend from the second connection portion 132*a* to a portion of the first surface 1 of the capacitor body 110.

In this case, the second band portion 132*b* may further extend to a portion of the fifth and sixth surfaces 5 and 6 of the capacitor body 110 and a portion of the second surface 2 so as to improve adhesion strength.

In a general multilayer capacitor, a bottleneck structure may be applied to an internal electrode to improve moisture resistance reliability, and a corner portion of the internal electrode, which may become a bottleneck pattern, may become a space portion, such that a step difference may be greatly formed, a short circuit rate of the capacitor may increase, and breakdown of withstand voltage may occur.

In the example embodiment, the first dot pattern portion may be formed in a corner portion of the first capacitance forming portion of the first internal electrode, the second dot pattern portion may be formed in a corner portion of the second capacitance forming portion of the second internal electrode, and the dot patterns of the first dot pattern portion and the second dot pattern portion may not overlap each other in the Z direction, such that the effect of improving moisture resistance reliability of the internal electrode of the general bottleneck pattern structure may be obtained, and a stepped portion may also be prevented.

Accordingly, a decrease in capacitance of the multilayer capacitor may be prevented, a short circuit rate of the capacitor may improve, and withstand voltage properties may improve.

Hereinafter, a test may be performed to identify a correlation between the thickness of the first and second electrode portions of the first and second dot pattern portions and capacitance of the capacitor.

As for the average thickness of the dot pattern portion, 10 layers of internal electrode were observed by observing a cross-sectional surface of the central portion of the multilayer capacitor in the Z direction, and thicknesses of five points with an equal distance therebetween was measured on the first layer, and an average thereof was used as the average of the 10 layers.

As for the average thickness of the capacitance forming portion, 10 layers of internal electrode were observed by observing a cross-sectional surface of the central portion of the multilayer capacitor in the Z direction, and thicknesses of five points with an equal distance therebetween were measured on the first layer, and an average thereof was used as the average of the 10 layers.

Figure 4:
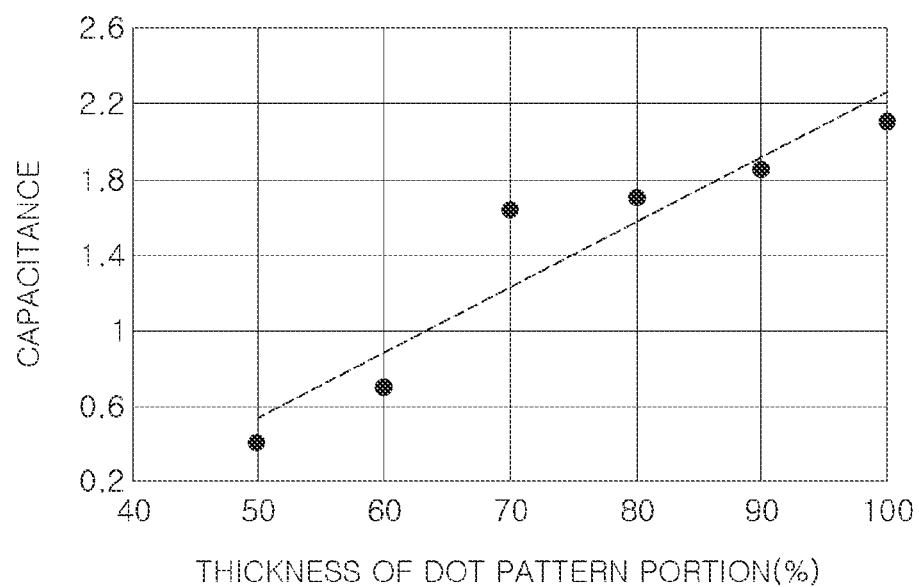
FIG. 4 is a graph illustrating changes in capacitance of a multilayer capacitor depending on changes in a thickness of a dot pattern portion.

FIG. 4 is a graph illustrating changes in capacitance of a multilayer capacitor depending on changes in a thickness of a dot pattern portion.

Referring to FIG. 4, when the average thickness of the electrode portion is less than 70% of the average thickness of the capacitance forming portion, the capacitance was rapidly decreased.

Therefore, when the average thickness of the electrode portion in the Z direction is 70% or more of the average thickness of the capacitance forming portion as in the example embodiment, the decrease in capacity may not be significant.

Figure 5:
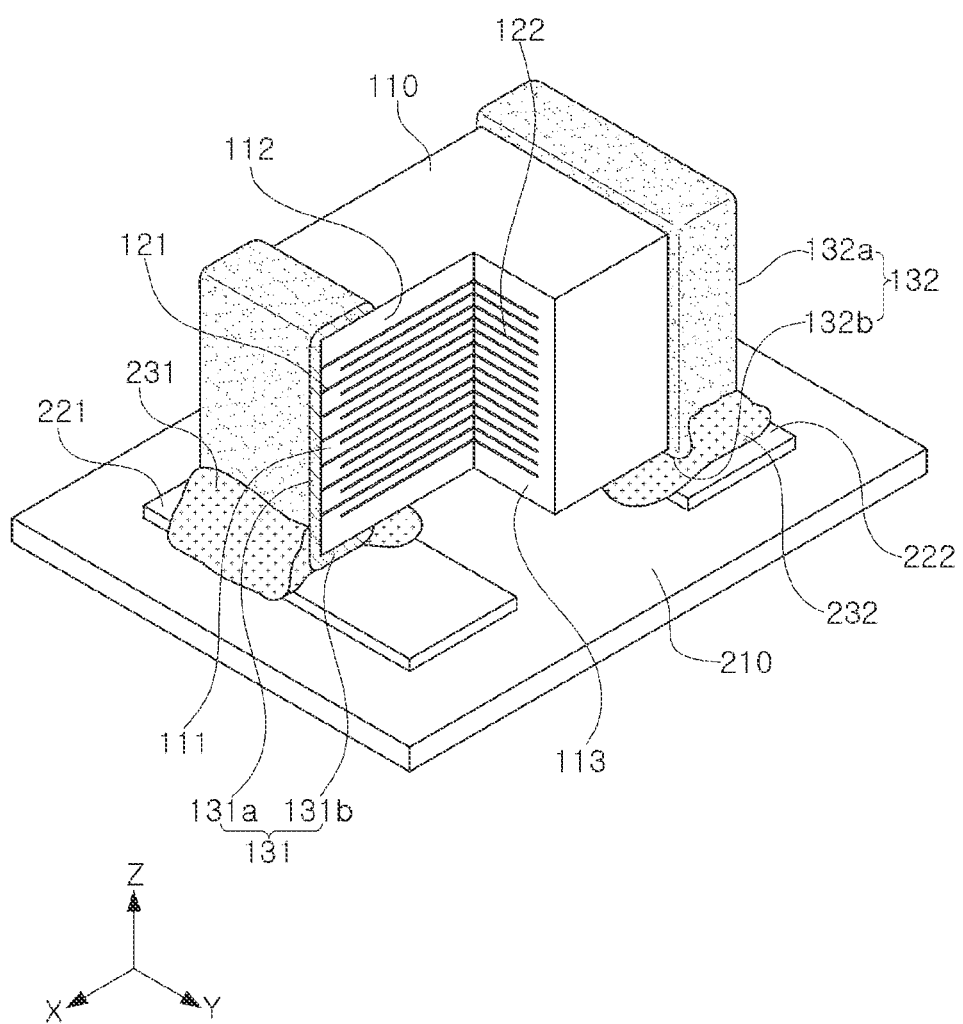
FIG. 5 is a perspective diagram illustrating a mounting board on which the multilayer capacitor illustrated in FIG. 1 is mounted.

FIG. 5 is a perspective diagram illustrating a mounting board on which the multilayer capacitor illustrated in FIG. 1 is mounted.

Referring to FIG. 5, the mounting board of the multilayer capacitor in the example embodiment may include a board 210 on which the multilayer capacitor 100 is mounted, and first and second electrode pads 221 and 222 disposed on an upper surface of the board 210 and spaced apart from each other.

The multilayer capacitor 100 may be mounted on the board 210 such that the first and second external electrodes 131 and 132 may be in contact with and connected to the first and second electrode pads 221 and 222, respectively.

In this case, the first external electrode 131 may be electrically and physically connected to and bonded to the first electrode pad 221 by a solder 231, and the second external electrode 132 may be electrically and physically connected to and bonded to the second electrode pad 222 by a solder 232.

The multilayer capacitor 100 may be the multilayer capacitor in the example embodiment described above, and a detailed description thereof will not be provided to avoid overlap.

Hereinafter, a method of manufacturing a multilayer capacitor in the example embodiment will be described.

First and second ceramic sheets may be prepared.

The first and second ceramic sheets may be provided to form the dielectric layer 111 of the capacitor body 110 and the upper and lower covers 112 and 113 of the upper and lower margins, and as for the sheets, slurry may be formed by mixing ceramic powder, a polymer, and a solvent, the slurry may be applied to a carrier film by a method such as a doctor blade method and may be dried, thereby forming a sheet having a thickness of several μm.

Thereafter, a conductive paste may be printed on the first and second ceramic sheets, thereby forming the first and second internal electrodes.

As a method of printing the conductive paste, a screen printing method or a gravure printing method may be used, but an example embodiment thereof is not limited thereto.

In this case, in the first internal electrode, a printing screen including a wire mesh may be disposed on the first ceramic sheet, a conductive paste may be applied to the wire mesh by a predetermined thickness, the first internal electrode pattern may be printed such that one end in the length direction may be formed as a lead-out portion having a bottleneck shape on the wire mesh to which the conductive paste is applied and a first dot pattern may be formed on at least one corner, and the exposed conductive paste may be developed.

Accordingly, the first internal electrode including the first capacitance forming portion, the first lead-out portion extending from the first capacitance forming portion toward the third surface of the capacitor body and connected to the first external electrode, and the first dot pattern portion formed in at least one corner of the first capacitance forming portion may be formed.

In the second internal electrode, a printing screen including a wire mesh may be disposed on the second ceramic sheet, a conductive paste may be applied to the wire mesh by a predetermined thickness, the second internal electrode pattern may be printed such that the other end in the length direction may be formed as a lead-out portion having a bottleneck shape on the wire mesh to which the conductive paste is applied and a second dot pattern may be formed on at least one corner to not overlap the first dot pattern, and the exposed conductive paste may be developed.

Accordingly, the second internal electrode including the second capacitance forming portion overlapping the first capacitance forming portion in the first direction, the second lead-out portion extending from the second capacitance forming portion toward the fourth surface of the capacitor body and connected to the second external electrode, and the second dot pattern portion formed in at least one corner of the second capacitance forming portion in the first direction and not overlapping the first dot pattern portion may be formed.

Thereafter, the plurality of first and second ceramic sheets on which the first and second internal electrodes are formed may be laminated such that the first and second internal electrodes may oppose each other with the first or second ceramic sheets interposed therebetween, and the ceramic sheets may be pressed, thereby forming a laminate.

In this case, a ceramic sheet on which no internal electrode is formed may be firstly laminated, and the plurality of first and second ceramic sheets may be laminated, and a ceramic sheet on which no internal electrode is formed may be further laminated and may be pressed.

Thereafter, the laminate may be cut for each region corresponding to a single capacitor and each other may be baked, such that the capacitor body including the first and second surfaces opposing each other in the first direction, the third and fourth surfaces opposing each other in the second direction perpendicular to the first direction, and the fifth and sixth surface disposed in the third direction perpendicular to the first direction, and including first and second lead-out portions of the first and second internal electrodes exposed through the third and fourth surfaces, respectively, may be manufactured.

Thereafter, by forming the first and second external electrodes on the capacitor body to be electrically connected to the first and second lead-out portions, respectively, the multilayer capacitor may be manufactured.

According to the aforementioned example embodiment, the dot pattern portions may be formed in the corners of the capacitance forming portion of the internal electrode, and the dot pattern portions of the internal electrodes overlapping vertically may be configured to not overlap each other, such that moisture resistance reliability of the multilayer capacitor may improve, the effect of preventing a step difference may be obtained.

While the example embodiments have been illustrated and described above, it will be apparent to those skilled in the art that modifications and variations could be made without departing from the scope in the example embodiment as defined by the appended claims.

What is claimed is:

1. A multilayer capacitor, comprising:
a capacitor body including first and second surfaces opposing each other in a first direction of the capacitor body, third and fourth surfaces opposing each other in a second direction of the capacitor body, and fifth and sixth surface disposed in a third direction of the capacitor body, and including a plurality of dielectric layers, and first and second internal electrodes alternately disposed in the first direction with the dielectric layer interposed therebetween; and
first and second external electrodes disposed on both ends of the capacitor body in the second direction, respectively,
wherein the first internal electrode includes a first capacitance forming portion, a first lead-out portion extending from the first capacitance forming portion toward the third surface of the capacitor body and connected to the first external electrode, and a first dot pattern portion disposed in at least one corner of the first capacitance forming portion, and
wherein the second internal electrode includes a second capacitance forming portion overlapping the first capacitance forming portion in the first direction, a second lead-out portion extending from the second capacitance forming portion toward the fourth surface of the capacitor body and connected to the second external electrode, and a second dot pattern portion disposed in at least one corner of the second capacitance forming portion.

2. The multilayer capacitor of claim 1, wherein the first dot pattern portion and the second dot pattern portion have dot patterns not overlapping each other in the first direction.

3. The multilayer capacitor of claim 1, wherein lengths of the first and second lead-out portions in the third direction are less than lengths in the third direction of the first and second capacitance forming portions, respectively.

4. The multilayer capacitor of claim 1,
wherein, in the first dot pattern portion, a dot-shaped first electrode portion and a first space portion are alternately disposed in the second and third directions, and
wherein, in the second dot pattern portion, a dot-shaped second electrode portion and a second space portion are alternately disposed in the second and third directions.

5. The multilayer capacitor of claim 4,
wherein the first electrode portion overlaps the second space portion in the first direction, and
wherein the second electrode portion overlaps the first space portion in the first direction.

6. The multilayer capacitor of claim 4,
wherein an average thickness of the first electrode portion is 70 to 90% of an average thickness of the first capacitance forming portion, and
wherein an average thickness of the second electrode portion is 70 to 90% of an average thickness of the second capacitance forming portion.

7. The multilayer capacitor of claim 1, wherein the capacitor body includes an active region in which the first and second capacitance forming portions overlap each other in the first direction, and upper and lower cover regions disposed on upper and lower surfaces of the active region, respectively.

8. The multilayer capacitor of claim 1, wherein the first and second external electrodes includes:
first and second connection portions disposed on the third and fourth surfaces of the capacitor body, respectively; and
first and second band portions extending from the first and second connection portions to a portion of the first surface of the capacitor body, respectively.

9. A method of manufacturing a multilayer capacitor, the method comprising:
forming first and second internal electrodes on first and second ceramic sheets, respectively;
forming a laminate by laminating a plurality of first and second ceramic sheets on which the first and second internal electrodes are formed such that the first and second internal electrodes oppose each other with the first and second ceramic sheets interposed therebetween and pressing the first and second ceramic sheets;
forming a capacitor body including first and second surfaces opposing each other in a first direction of the capacitor body, third and fourth surfaces opposing each other in a second direction of the capacitor body, and fifth and sixth surface disposed in a third direction of the capacitor body, and including first and second lead-out portions of the first and second internal electrodes exposed through the third and fourth surfaces, respectively, by cutting the laminate at each region corresponding to a single capacitor and performing baking; and
forming first and second external electrodes on the capacitor body to be electrically connected to the first and second lead-out portions, respectively,
wherein the first internal electrode includes a first capacitance forming portion, a first lead-out portion extending from the first capacitance forming portion toward the third surface of the capacitor body and connected to the first external electrode, and a first dot pattern portion formed in at least one corner of the first capacitance forming portion, and
wherein the second internal electrode includes a second capacitance forming portion overlapping the first capacitance forming portion in the first direction, a second lead-out portion extending from the second capacitance forming portion toward the fourth surface of the capacitor body and connected to the second external electrode, and a second dot pattern portion formed in at least one corner of the second capacitance forming portion.

10. The method of claim 9, wherein the second dot pattern portion is formed to not overlap the first dot pattern portion in the first direction.

11. The method of claim 9, wherein the first internal electrode is formed by disposing a printing screen including a wire mesh on the first ceramic sheet, applying a conductive paste to the wire mesh by a predetermined thickness, and printing a first internal electrode pattern such that one end in a length direction is formed as the first lead-out portion having a bottleneck shape on the wire mesh to which the conductive paste is applied and the first dot pattern is formed in the at least one corner, and developing an exposed conductive paste, and
wherein the second internal electrode is formed by disposing a printing screen including a wire mesh on the second ceramic sheet, applying a conductive paste to the wire mesh by a predetermined thickness, and printing a second internal electrode pattern such that the other end in the length direction is formed as the second lead-out portion having a bottleneck shape on the wire mesh to which the conductive paste is applied and the second dot pattern is formed in the at least one corner, and developing an exposed conductive paste.

* * * * *